Figure 1:
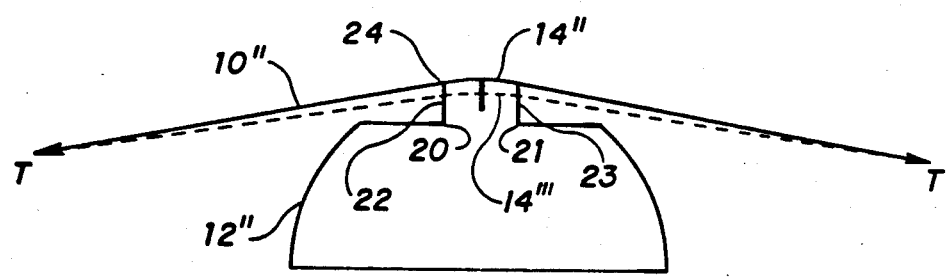

United States Patent [19]

Lacey et al.

[11] Patent Number: 4,888,657
[45] Date of Patent: Dec. 19, 1989

[54] CONTOURED HEAD ASSEMBLY FOR USE IN A CASSETTE LOADED RECORDER

[75] Inventors: Christopher A. Lacey, Willimantic, Conn.; George W. Brock, La Jolla, Calif.

[73] Assignee: Eastman Kodak Company, Rochester, N.Y.

[21] Appl. No.: 274,540

[22] Filed: Nov. 21, 1988

Related U.S. Application Data

[63] Continuation of Ser. No. 138,788, Dec. 28, 1987, abandoned.

[51] Int. Cl.$^4$ .............................................. G11B 5/22
[52] U.S. Cl. ................................................. 360/122
[58] Field of Search ........................................ 360/122

[56] References Cited

U.S. PATENT DOCUMENTS

| | | | |
|---|---|---|---|
| 3,416,149 | 12/1968 | Stahler | 340/174.1 |
| 3,737,582 | 1/1973 | DeMoss | 360/122 |
| 4,298,899 | 11/1981 | Argumedo et al. | 360/122 |
| 4,636,898 | 1/1987 | Suzuki et al. | 360/122 |
| 4,649,448 | 3/1987 | Nakajima | 360/122 |

FOREIGN PATENT DOCUMENTS

| | | | |
|---|---|---|---|
| 57-200922 | 12/1982 | Japan | 360/122 |
| 59-16119 | 1/1984 | Japan | 360/122 |
| 59-213013 | 12/1984 | Japan | 360/122 |
| 61-5408 | 1/1986 | Japan | 360/122 |
| 61-80607 | 4/1986 | Japan | 360/122 |

OTHER PUBLICATIONS

IBM/TDB vol. 4, No. 2, Jul. 1961 "Channeled Magnetic Head" by Magura.
IBM/TDB vol. 19, No. 5, Oct. 1976 "Stabilized Wasp-Waist Head" by Nelson et al.
IBM Technical Disclosure Bulletin, vol. 17, No. 3, 8/74, p. 765.
Patent Abstracts of Japan, vol. 9, No. 83 #59/213,013; Dec. '84, Inoue et al.
Patent Abstracts of Japan, vol. 9, No. 285; #60/124,052; Jul. '85; Motosawa et al.

Primary Examiner—John H. Wolff
Attorney, Agent, or Firm—Daniel Robbins

[57] ABSTRACT

To obtain the correct tape wrap angle at the head in a cassette loaded recorder, tape guiding support "outriggers" integral with the head assembly are provided. The outriggers are located on either side of the active portion of the head structure to guide the tape and to establish the tape/head wrap angle independent of the exact locations of the cassette guides. Slots separate the active head structure from each of the outriggers, presenting an edge at each side of the head to skive any air film adherent to the moving tape as it approaches the head's transducer. Additionally, the entire head and outrigger structure is fabricated from the same or mechanically similar materials and has an overall constant area profile contour which wears at a uniform rate due to tape abrasion.

3 Claims, 2 Drawing Sheets

CONTOURED HEAD ASSEMBLY FOR USE IN A CASSETTE LOADED RECORDER

This application is a continuation of Application Ser. No. 138,788, filed Dec. 28, 1987, now abandoned. Related co-pending commonly assigned applications are Application Ser. No. 138,756, filed Dec. 28, 1987, and Application Ser. No. 138,764, filed Dec. 28, 1987, and refiled as Continuation Application Ser. No.

BACKGROUND OF THE INVENTION

1. Field of the Invention

This invention relates to the contour of a magnetic head assembly, and in particular to a contour that provides improved contact at the magnetic head-magnetic tape interface of a cassette loaded recorder.

Figure 2:
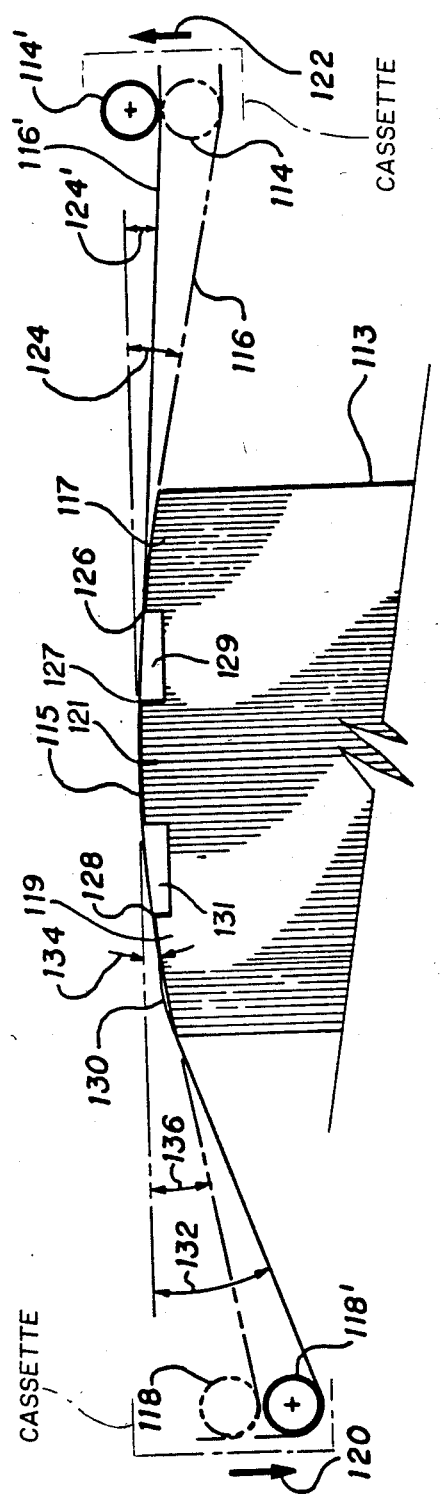

The invention, as well as the prior art, will be described with reference to the drawings of which:

FIG. 1 illustrates a magnetic head contour over which the invention provides improvement, and, FIG. 2 illustrates magnetic tape in contact with a magnetic head assembly having a contour in accordance with the teachings of the invention under various cassette guiding conditions.

2. Description of the Prior Art

The contact between the magnetic head and the magnetic tape is crucial in determining the performance of a magnetic tape recording system. During recording it is essential that the gap of the head, which is the source of the recording flux, be in intimate contact with the tape to effect efficient signal transfer, and during playback intimate contact is essential to provide effective coupling of the magnetic field from the tape to the playback head. While adequate contact is essential at all wavelengths, it is particularly important at short recorded wavelengths due to the well known spacing loss effect which becomes increasingly severe as the wavelength decreases.

An improved head contour to eliminate problems of the increase in size of the contact region and the "flying" of the tape as described in copending commonly assigned U.S. patent application Ser. No. 138,756 entitled "Magnetic Head With Constant Area Wear Profile" in the name of R. J. McClure. Referring to FIG. 1, a radiused head is provided with shoulders 20, 21 which define the head-tape contact region 14''. The tape 10'' engages the contact region 14'' at the edge of the plane 22 comprising one face of the shoulder 20. It remains in contact with the head while traversing the region 14'', and exits from the contact region 14'' at the plane 22' which comprises a face of the shoulder 23. The edge 24 at which the tape engages the contact region 14'' skives any entrained air which may be adherent to the tape prior to the tape contacting the head at 14'. Removal of this air layer significantly improves head/tape contact over the entire surface of the head by elimination of the air film required to support tape "flying".

Additionally, McClure teaches contouring the head surface so the tape exerts constant pressure at all points of the head/tape contact region. The industry practice has been to set the radius of the head at about 0.125", but, in general, at this radius the pressure of the tape is not uniformly distributed over the head surface. Experience shows that the radius and the contour of the head change as the head wears due to tape abrasiveness. It will be appreciated that in areas where the contact region experiences "high" pressure the head will wear faster than it will in areas that experience "low" pressure. The head will wear so as to assume a contour where the pressure is uniform across the entire surface. According to McClure's teaching, however, if the head contour is initially shaped so that all points of contact of the head surface are under identical pressure during normal operation, then head wear will be uniform over the life of the head and the contour at the region of contact 14''' will maintain the contour of the original region of contact 14''. The optimum contour has been designated as a "constant area profile" surface since it provides a constant area head/tape contact region over the life of the head.

While the above described head contour improves head/tape contact in many applications, the constant area profile contour is still subject to a troublesome contact problem that arises in a cassette loaded recording system due to mechanical tolerances in both the cassette and in positioning the cassette in a recorder. A cassette provides a convenient and inexpensive means of interchangeably coupling magnetic tape with a recording system, and cassettes are attendantly widely used in the bulk storage of magnetic tape data. At long wavelengths, such as arise in the analog recording of music or speech, contact requirements are less critical, and inexpensive molded plastic cassettes adequately position the tape to contact the head when inserted into the recorder. At the short wavelengths and narrow track widths which are characteristic of high density digital or video recording, and when cost considerations preclude servo positioning the head over the recorded track, a precisely fabricated cassette has been required to insure a proper head/tape interface.

SUMMARY OF THE INVENTION

To obtain the correct tape wrap angle at the head in a cassette loaded recorder, tape guiding support "outriggers" integral with the head assembly are provided. The outriggers are located on either side of the active portion of the head structure to guide the tape and to establish the tape/head wrap angle independent of the exact locations of the cassette guides. Slots separate the active head structure from each of the outriggers, presenting an edge at each side of the head to skive any air film adherent to the moving tape as it approaches the head's transducer. Additionally, the entire head and outrigger structure is fabricated from the same or mechanically similar materials and has an overall constant area profile contour which wears at a uniform rate due to tape abrasion.

DESCRIPTION OF THE INVENTION

Referring to FIG. 2, the detailed geometry of a head assembly 113 fabricated in accordance with the teaching of the invention is shown in relation to cassette guides having nominal positions 114, 118 with resultant tape path 116, and displaced guide positions 118', 114' with resultant tape path 116'. (Nominal positions and the associated tape path are shown in phantom while displaced positions and associated tape path are shown in solid lines.) The head assembly 113 is comprised of a center land section 115 with an included magnetic transducing 121 and two outriggers 117 and 119. The entire head assembly 113 has a constant area profile extending across the center land 115 and the outriggers 117, 119 as previously described. Due to tolerances in cassette construction, the position of the guide 114 is displaced in the direction of arrow 122 to the position 114'. The nominal wrap angle 124 is thereby changed to 124'. It will be noted however, even though the wrap angle 124', with which the tape path 116 approaches the outrigger 117 is reduced relative to wrap angle 124, the tape 116' remains in contact with the outrigger 117 in approaching the center land 115 and magnetic transducing element 121. The wrap angle at the magnetic head element 121 at the center land 115 continues to have the identical value that obtains when the guide position 114' is the nominal position 114. Resultantly, the contact area over the center land 115 and the magnetic transducing element 121, and the attendant magnetic head performance remains invariant because of the tape guiding by the outrigger 117 even though the guide position 114' is displaced from the nominal position 114. Similarly, when the guide position 118 is displaced as shown by arrow 120 to position 118', the nominal wrap angle 136 becomes a larger wrap angle 132 with attendant "tenting" 130. However, the "tenting" 130 occurs on the surface of the outrigger 119 and not on the head surface at the magnetic transducing element as in the prior art. The tape is again completely in contact with the outrigger 119 before reaching the outrigger corner 128, and therefore wrap angle 136 at which the tape path 116' approaches the center land 115 equals the value of wrap angle that obtains when the guide position 118' is its nominal position 118. It will be appreciated for both conditions of displacement of the cassette guide positions 114, 118, the tape path is unaffected, and tape/head contact over the magnetic transducing element 121 and the center land 115 remains constant regardless of tolerance related displacements of the cassette guides from their nominal positions.

The invention has been described in detail with particular reference to preferred embodiments thereof, but it will be understood that variations and modifications can be effected within the spirit and scope of the invention. For example, the teachings of the invention may be applied to the magnetic head assemblies of other magnetic recorders not employing cassettes, such as reel to reel recorders or loop recorders not having precisely positioned tape guiding elements.

What is claimed is:

1. In a recording system including a magnetic transducer assembly, the improvement comprising:
   a, means for transporting a recording medium over said magnetic transducer assembly, said assembly having a magnetic transducing element located thereon,
   b, means, external to said magnetic transducer assembly, for guiding said recording medium at nominal wrap angles relative to said magnetic transducing element,
   c, said magnetic transducer assembly further comprising
   an arcuate surface extending in the direction of said medium's motion, and
   having two slots therein, said slots dividing said arcuate surface into a first outrigger, a central land for containing said magnetic transducing element at the apex thereon, and a second outrigger, wherein 1, the edges of said slots prevent entrainment of air between said medium and said magnetic transducing element, 2, said outriggers so position said medium as to maintain said nominal wrap angles substantially independent of variations in said means for guiding, and 3, said arcuate surface being so shaped that said recording medium continues to exert a constant pressure across said surface as said surface wears, whereby said surface maintains a constant area profile.

2. The magnetic transducer assembly of claim 1 wherein said outriggers are symmetrically located relative to said magnetic transducing element.

3. A magnetic transducer assembly comprising:
   a, a land having a magnetic transducer located on a surface at the apex thereof for recording or playing back a magnetic tape,
   b, a first outrigger adjacent to said land whereby said magnetic tape contacts said first outrigger on a surface thereof before contacting said land,
   c, a second outrigger adjacent to said land whereby said magnetic tape contacts said second outrigger on a surface thereof after contacting said land, and
   d, said surface of said first outrigger, said surface of said land and said surface of said second outrigger comprise a contact area profile contour of said magnetic transducer assembly, wherein a cooperating magnetic tape traversing said assembly provides uniform pressure across said surface of said first outrigger, said surface of said land and said surface of said second outrigger whereby said constant area profile contour remains invariant under wear.

* * * * *